United States Patent [19]

Ortemond

[11] Patent Number: 5,111,766

[45] Date of Patent: May 12, 1992

[54] SEA WING

[76] Inventor: Leon D. Ortemond, Rte. 2, Box 2290, Abbeville, La. 70510

[21] Appl. No.: 642,807

[22] Filed: Jan. 18, 1991

[51] Int. Cl.⁵ ............................................. B63B 1/32
[52] U.S. Cl. ................................. 114/273; 114/272
[58] Field of Search ............. 114/272, 273; 244/76 C, 244/87

[56] References Cited

U.S. PATENT DOCUMENTS

| | | | |
|---|---|---|---|
| 978,311 | 12/1910 | Lake | 114/273 |
| 2,354,453 | 7/1944 | Gazda | 114/272 |
| 2,580,176 | 12/1951 | Johnson | 244/87 |
| 3,734,432 | 5/1973 | Low | 244/76 C |
| 3,884,172 | 5/1975 | Takahashi | 114/273 |
| 4,237,810 | 12/1980 | Westfall | 114/272 |
| 4,706,902 | 11/1987 | Destuynder et al. | 244/76 C |
| 4,725,020 | 2/1988 | Whitener | 244/76 C |
| 4,827,862 | 5/1989 | Enriquez | 114/273 |
| 4,926,778 | 5/1990 | Johnston | 114/273 |
| 4,940,433 | 7/1990 | Raber | 114/273 |

Primary Examiner—Sherman Basinger
Assistant Examiner—Thomas J. Brahan
Attorney, Agent, or Firm—Browning, Bushman, Anderson, & Brookhart

[57] ABSTRACT

An aerodynamic wing apparatus for use with a boat to reduce drag on the hull of a boat by lifting the boat partially out of the water. The wing is movable fore and aft so that it may be positioned near the center of gravity of the boat as the center of gravity changes depending upon the loading of the boat. The wing has variable pitch to provide for a relatively constant amount of lift over a range of boat speeds.

12 Claims, 3 Drawing Sheets

SEA WING

BACKGROUND OF THE INVENTION

1. Field of the Invention

The present invention relates generally to aerodynamic wings or aerofoils for use with boats and, more particularly, to aerodynamic wings to reduce drag on a boat hull by providing a lifting force near the variable center of gravity of the boat.

2. Description of the Prior Art

In recent years, various means have been developed for raising the hull of a boat in the water to reduce the drag, or retarding force, acting on the hull as the boat moves through the water.

One means for providing this lifting force is through use of hydrofoils. Several hydrofoils can be mounted on struts below the boat to provide a lifting force on the boat that increases as the speed of the boat increases. As the boat rises out of the water, the retarding forces acting on the hull are greatly reduced. For the same amount of energy applied to the propeller, a substantial increase in boat speed is achieved. Although this technique is successful, it does have limitations. For instance, the draft of the boat is necessarily deeper when the boat is going too slow to utilize the hydrofoils beneath the boat. The hydrofoils also affect the steering of the boat at low speeds which creates problems for docking, unloading via crane when water currents affect boat position, and other slow speed maneuvers. Furthermore, the lifting force is generally entirely dependent on boat speed because the hydrofoils generally have a fixed pitch, or angle, relative to the water. Depending on sea conditions, it may be desirable to provide only a certain amount of lift to the hull. However, because the hydrofoil generally has no adjustment for pitch, the only way this can be done is by driving the boat at a specific speed which may not always be a optimum speed for the particular conditions.

On the other hand, the use of an aerodynamic wing above the boat has generally not been successful because, for at least one reason, the placement of such a wing has been so problematical that it has not been thought possible or useful to attempt to realize the benefits of any lifting force that such a wing would provide. The problem encountered is that the lifting force of the wing often causes the boat to assume an awkward pitch with the stern or bow too high. When the boat assumes such an awkward position any gains in efficiency obtained by lifting the hull are lost due to the added resistance the hull may acquire because of its awkward pitch.

Consequently, a need exists for improvements in using aerodynamic wings on boats which will result in greater efficiency and dependability of operation at reduced levels of energy consumption.

SUMMARY OF THE INVENTION

The present invention provides an aerodynamic wing or aerofoil, juxtaposed and substantially parallel to the top deck of a boat, that is movable fore and aft longitudinally between the bow and stern of the boat in a direction that is generally substantially parallel to the keel of the boat, to satisfy the aforementioned needs. Furthermore, the present invention provides for a wing having an adjustable pitch so that the amount of lifting force of the wing can be adjusted to be suitable for variable boat speeds and weather conditions.

To solve the problem of producing an awkward pitch of the boat due to the lift of the wing, it has been determined that it is generally desirable to have the lifting force created by an aerodynamic surface located at the approximate center of gravity of the boat. Unfortunately, this center of gravity will typically change depending on the loading of the boat which would encompass such factors as the amount of fuel in the tanks, the distribution of cargo, the number and placement of passengers, etc. However, in using a wing which can be moved longitudinally fore and aft, the position of the wing can be shifted so that when the force from the wing lifts the hull partially from the water, the pitch of the boat can be adjusted to the position which results in the minimum amount of drag being applied to the hull of the boat. This reduction in drag is achieved by moving the wing proximate to the center of gravity of the boat. The center of gravity of the boat generally refers to the longitudinal center of gravity such that both longitudinal halves of the boat are assumed to be symmetrical. With this in mind, the longitudinal center of gravity will be the point along the longitudinal axis of the boat at which the sum of moments of force acting on the longitudinal axis on both sides of the center of gravity are essentially equal.

An aerodynamic surface, or airfoil, is used to generally refer to a body shaped so as to produce an aerodynamic reaction (lift) normal to its direction of motion, for a small resistance (drag) in that plane containing the direction of motion. In the boat wing apparatus of the present invention, the lifting force of a wing mounted above the boat can be held fairly constant for a wide range of speeds because the aerodynamic surface is provided with an adjustable pitch. An advantage of having the wing mounted above the boat a compared with hydrofoils below the boat is that it is mechanically much easier, and therefore less expensive, to provide a mechanism for varying the pitch of the aerofoil than it is for the hydrofoil.

For the most part, the range of longitudinal adjustment to the wing will not extend from stern to bow but can be limited to the amount by which the center of gravity of the boat changes. This amount or range will vary depending on the type of boat and the purposes for which it will be used but it can be estimated within reason during the design phase of building the boat. For instance, a crew boat approximately one hundred feet long for operating in the Gulf of Mexico to serve offshore rigs may require a range of movement of approximately twenty-five feet about the center of gravity of the boat.

Having the wing above the boat will provide an advantage over hydrofoils at low speeds because the draft of the boat will not be so deep. As well, the steering of the boat at low speeds will not be affected as much as if hydrofoils were mounted below the boat. Also, normally a single wing located in a central range over the boat will generally not interfere with loading or unloading of the boat.

DESCRIPTION OF THE PREFERRED EMBODIMENTS

Figure 1:
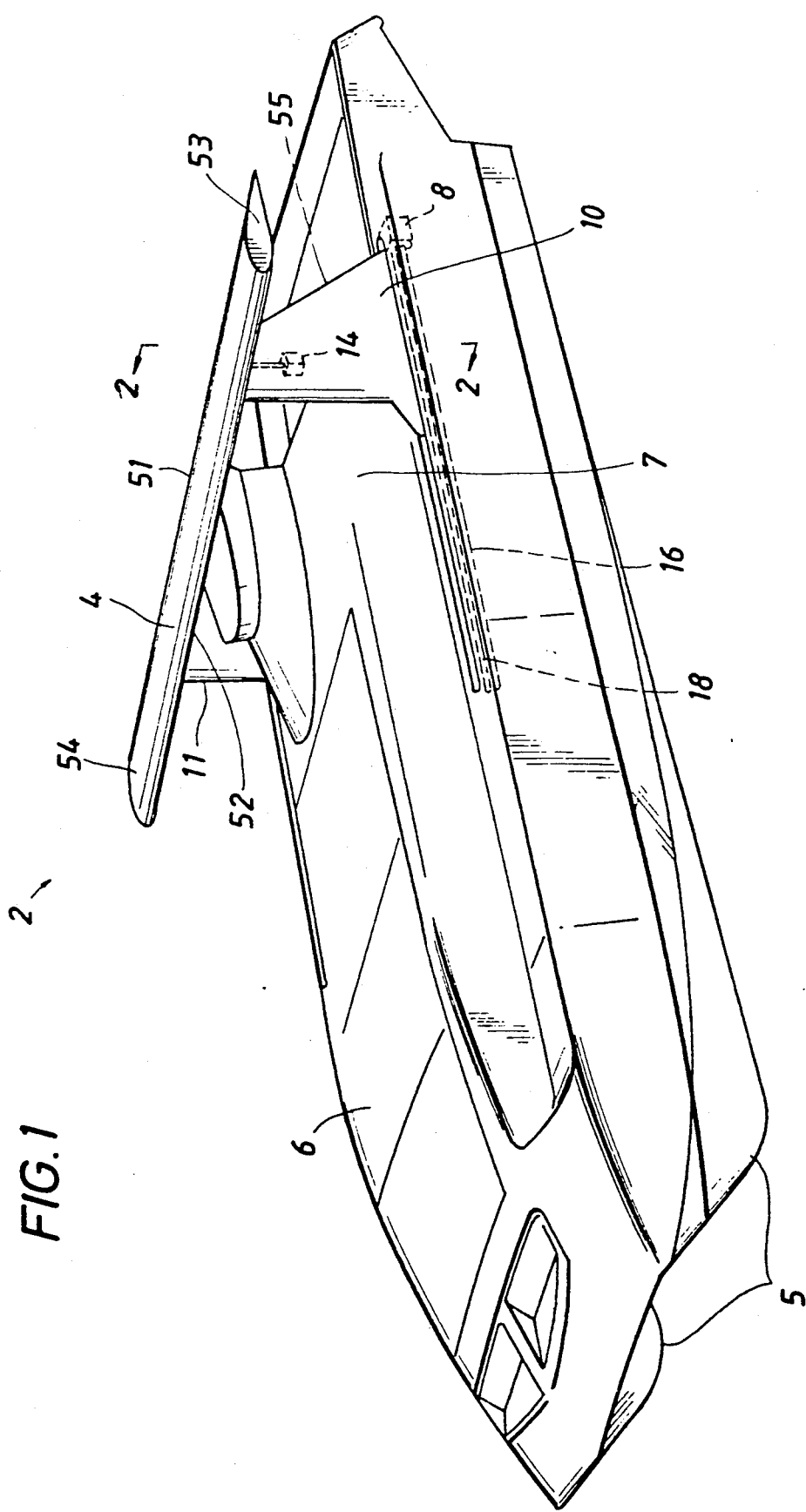
FIG. 1 is a frontal perspective view, partially in section, showing a boat wing assembly according to the present invention.

Referring now to the drawings, and more particularly to FIG. 1, there is shown a boat wing apparatus, generally designated 2, according to the present invention. The aerodynamic shaped wing 4 is mounted upon boat 6 by struts 10 and 11 and is juxtaposed and substantially parallel to top deck 7. As the lifting force created by aerodynamic shaped wing 4 lifts hull 5 of boat 6, drag on hull 5 as boat 6 moves through the water (not shown) is decreased. Wing 4 includes two longer sides 51 and 52 which are orthogonal to longitudinal axis 55 of boat 6 which runs from bow to stern of boat 6. Wing 4 also includes short side 53 mounted on the port side of boat 6 and short side 54 mounted on the starboard side of boat 6.

Figure 2:
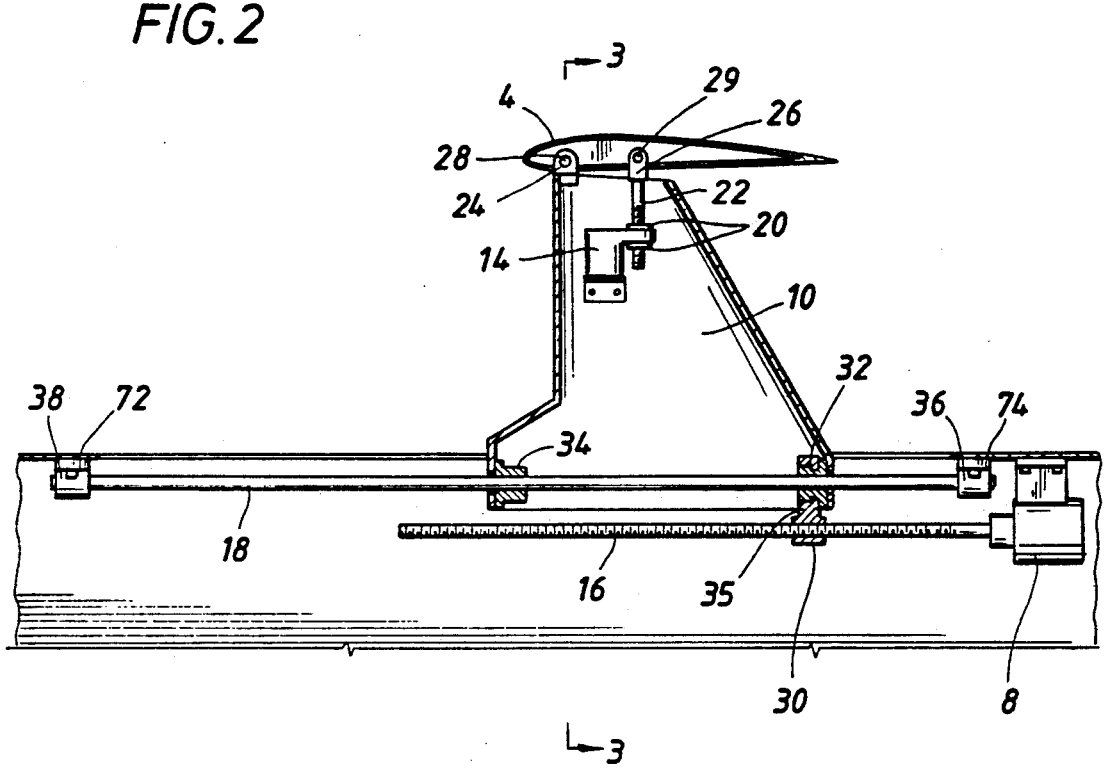
FIG. 2 is a side elevational view, partially in section, taken along the lines 2—2 of FIG. 1, showing the drive assemblies of a preferred embodiment of the present invention.
Figure 3:
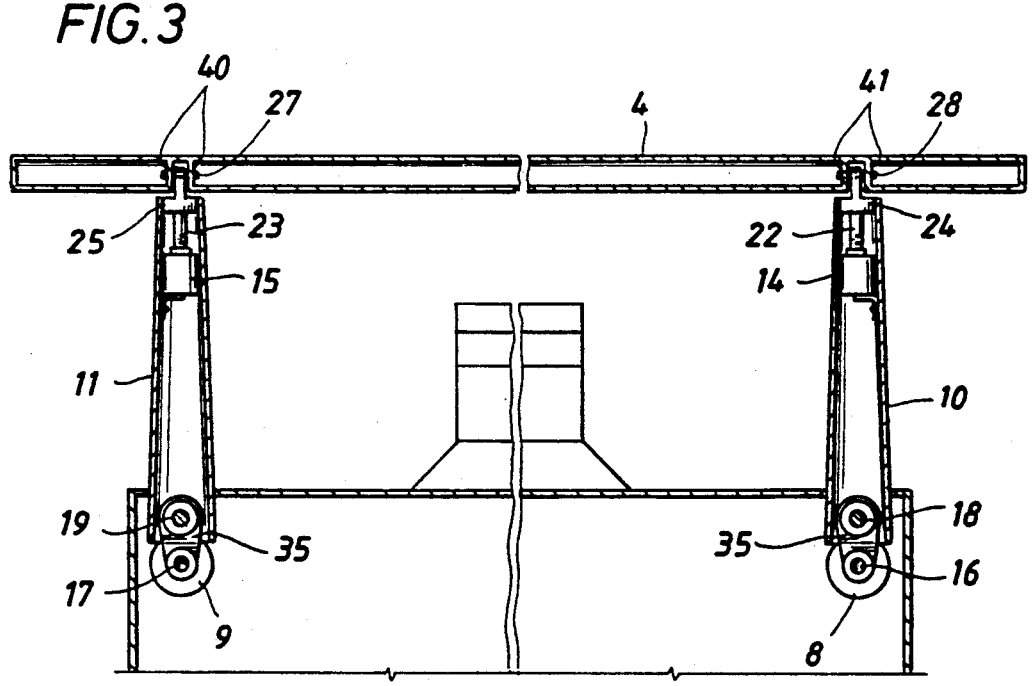
FIG. 3 is a side elevational view, in section, taken along the lines 3—3 of FIG. 2., showing preferred embodiment attachments used to secure the wing to the boat.

Referring to FIG. 2 and 3, drive motors 8 and 9 operate to position wing 4 to the fore and aft while drive motors 14 and 15 operate to vary the pitch of wing 4. Struts 10 and 11 are slidably mounted upon support shafts 18 and 19. Strut 10 connects to support shaft 18 by bearings 32 and 34. Support shaft 18 is secured to boat 6 by support mounts 36 and 38. Strut 11 is connected to support shaft 19 in an identical manner (not shown in entirety). As well, and although not shown, support shaft 19 is fixed to boat 6 in a manner identical to that of support shaft 18. Bearing 32 is attached to drive nut 30 by coupling 35. As motor 8 rotates threaded shaft 16, drive nut 30 can be moved fore and aft. To this end drive nut 30 is provided with internal threads which mate with the threads of shaft 16. Drive nut 30 is prevented from rotating by being secured via coupling 35 to bearing 32. Accordingly rotation of shaft 16 results only in fore and aft movement of nut 30 along shaft 16. Motor 9 operates threaded shaft 17 in an identical way so that struts 10 and 11 move fore and aft simultaneously.

Motors 14 and 15 operate to move threaded shafts 22 and 23 so that the pitch of wing 4 may be varied. Referring to FIG. 2, motor 14 revolves nut drive 20 so that shaft 22, which is prevented from rotation by connection to pivot hinge 26, moves axially along its own axis to change the position of pivot hinge 26 and thereby adjust the pitch of wing 4. Pivot hinge 26 connects to wing 4 through pin 29. Pins 27 and 28 extend through webs 40 and 41 of wing 4 and pivot hinges 24 and 25 respectively to rotatably secure wing 4 to struts 10 and 11.

Figure 4:
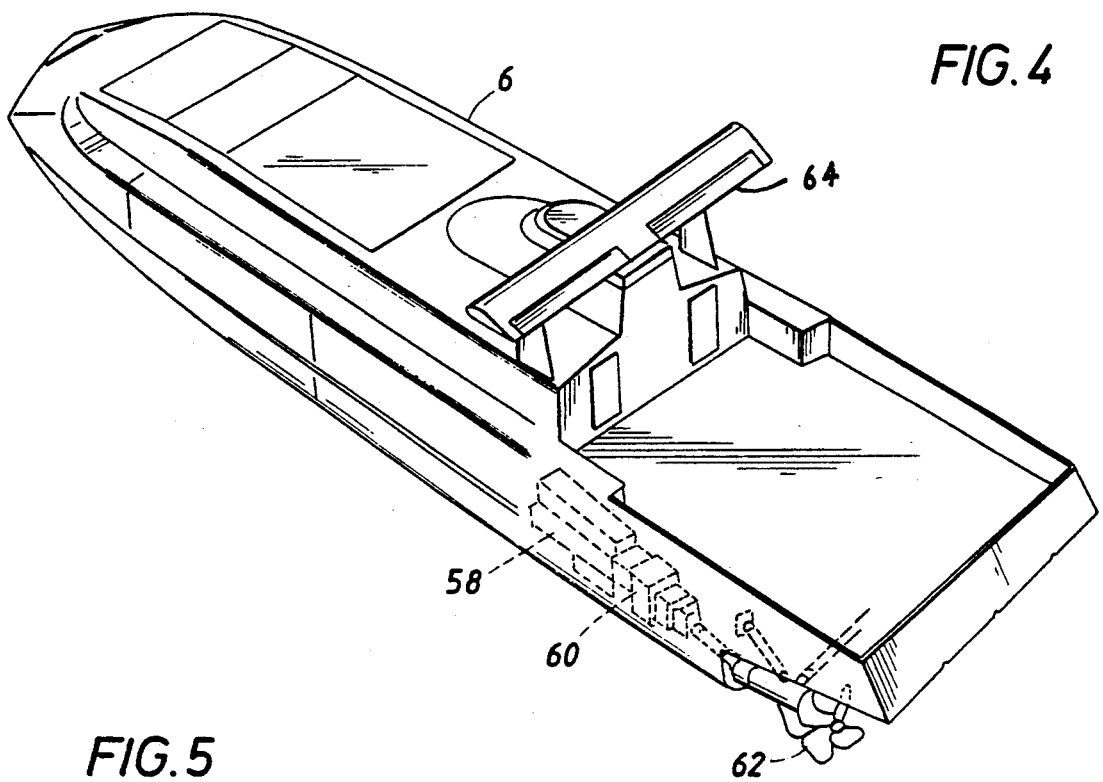
FIG. 4 is a rear perspective view, partially in section, showing a preferred embodiment motor and propeller assembly for driving the boat.

Motor 58 of FIG. 4 is used to power propeller 62 to move boat 6 through the water. A two speed transmission 60 is used to vary the torque necessary for motor 58 to apply to the drive shaft in order to rotate propeller 62 in the water. Tension sensors 72 and 74, mounted at the positions indicated in FIG. 2, are used to measure the lift provided by wing 4 which will be dependent on the speed of boat 6 and the pitch of wing 4. Obviously, other types of pressure or tension transducers located in other positions could also be used to measure the lift.

As boat 6 is powered through the water by motor 58 above approximately 30 miles per hour, the lifting force available from wing 4 generally becomes significant depending on the size of the wing, the wind speed and direction, and the pitch of the wing. The pitch of wing 4 is thereupon adjusted by motors 14 and 15 to obtain a desired lifting force as measured by tension sensors 72 and 74 on support shaft 18. Identical tension sensors (not shown) are used with support shaft 19. At this time, the hull 5 of boat 6 begins to rise partially out of the water. If boat 6 is not balanced properly with respect to the lifting force from wing 4, boat 6 will assume an awkward pitch in the water so that drag forces will prevent an increase in speed of boat 6. Motors 8 and 9 are used to position wing 6 at the approximate longitudinal center of gravity which will allow boat 6 to have less drag on hull 5. With the drag on hull 5 reduced to a minimum, the two speed transmission 60 is switched to high gear so that the propeller 62 can be rotated in the water at a higher speed. In this way, a motor which normally may only drive the boat 6 through the water at forty miles per hour may achieve speeds of sixty miles per hour for an increase in efficiency of approximately fifty percent. Additionally, manufacturing costs are decreased because a less powerful motor can be used to drive boat 6 at the desired speeds than would otherwise be necessary. A less powerful motor will often be lighter as well as less expensive to reduce the overall weight and cost of the boat.

Figure 5:
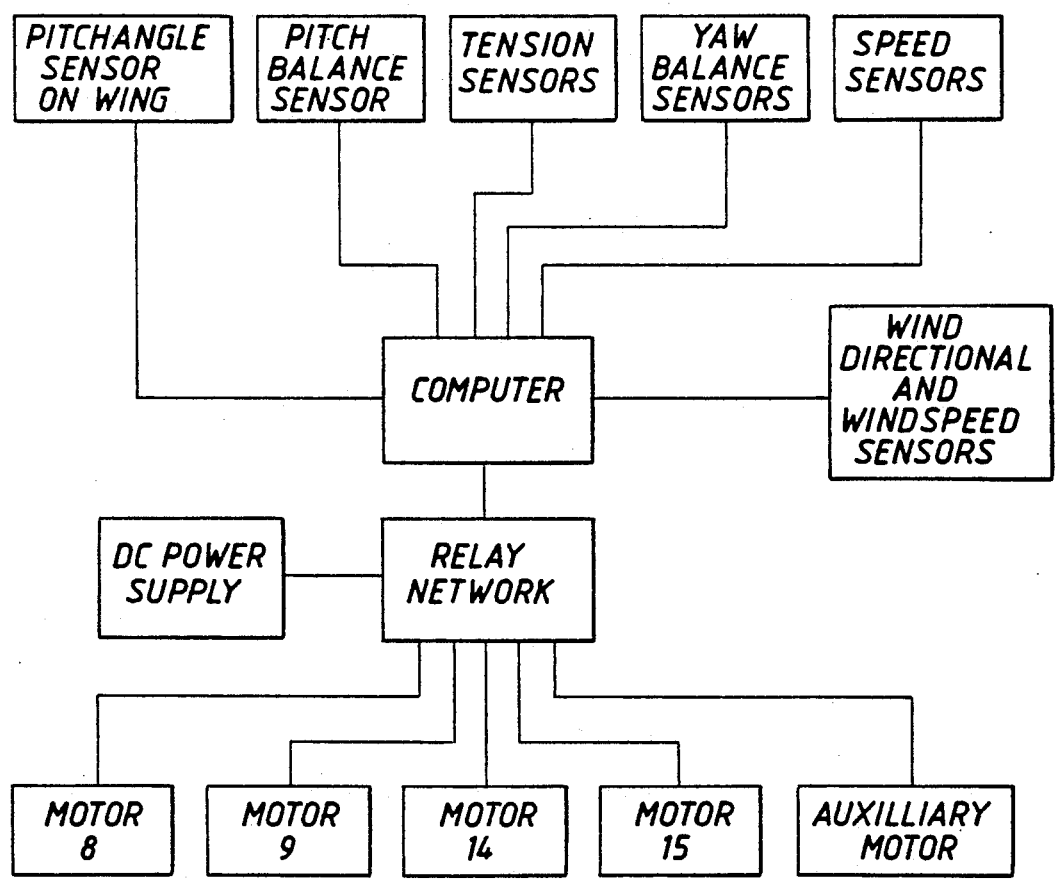
FIG. 5 is a block diagram schematic, showing a preferred embodiment computer control system for the boat wing assembly.

A control system as illustrated in FIG. 5 can be used to maintain the pitch of wing 4 at a position so that a substantially constant lifting force, as measured by tension sensors 72 and 74, will be maintained as the boat speed and wind speed vary. Furthermore, balance sensors to measure the pitch of the boat can be used with a control system to adjust the pitch of the boat by keeping the longitudinal position of wing 4 at the point which generally allows the least resistance to the hull which will be approximately at the center of gravity of the boat 6. It is understood that the center of gravity will also be affected by the changing buoyant forces of the waves so that the meaning of center of gravity includes an average or mean center of gravity.

It will be appreciated that hydraulic controls could also be used to adjust wing 4 pitch and longitudinal position. The wing 4 section could also be made quite sophisticated and include elevators 64, or other airfoils, which could be controlled to counteract any yaw or rolling that may occur in the boat as it rides along the water surface as measured by a yaw balance sensor as indicated in FIG. 5. A computer operated control system as illustrated in FIG. 5 may also connect to the various sensors so as to make the desired adjustments to the wing automatically. The computer of FIG. 5 incorporates the information from the sensors shown and operates a relay system which directs voltage to the appropriate motors for adjustments to wing 4. As well, variable pitch propellers or other types of transmissions may be used to vary the torque and rotational speed of the propeller to best match the speed of the boat. It is also contemplated that more than one aerodynamic wing could be used to achieve the aforedescribed lifting effect.

It is thought that the boat wing apparatus of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

What is claimed is:

1. A boat wing apparatus, comprising:
   (a) a vessel for traveling on water surfaces, said vessel having starboard and port sides, said vessel having a top deck and a hull, said vessel having a bow and a stern, said vessel having a propulsion means for moving said vessel through said water at varying speeds, said vessel having a variable center of gravity dependant on loading of said vessel including forces acting on said vessel as said vessel travels, said vessel having a longitudinal axis running from said bow to said stern of said vessel;
   (b) at least one substantially rigid wing attaching to said vessel;
   (c) a pair of rigid struts permanently fixed in an upwardly extending position from said vessel disposed in spaced relation to one another but being slidably secured to said vessel on opposite sides thereof such that said struts translate fore and aft with respect to said vessel, said wing being attached to said struts such that said wing is translatable fore and aft without changing the pitch of said wing and so that said wing can be positioned proximate to said variable center of gravity of said vessel; and
   (d) a power unit connected to said struts for translating said struts and said wing fore and aft, said power unit being operable to allow powered translation during travel of said vessel to correct for said forces acting on said boat during travel in order to control the pitch of said vessel.

2. A boat wing apparatus as recited in claim 1, wherein:
   said pair of struts juxtapositioning said wing to said top deck of said vessel such that an airflow passage exists between said top deck and said wing.

3. A boat wing apparatus as recited in claim 2, further comprising:
   said wing having two shorter sides and two longer sides with respect to each other, said longer sides of said wing being mounted to run from starboard to port so as to be orthogonal to said longitudinal axis, one of said shorter sides being on the port side of said wing and the other said shorter side being on the starboard side of said wing.

4. A boat wing apparatus as recited in claim 1, further comprising:
   at least one aerodynamic surface on said wing having an adjustable pitch about a single axis of rotation transverse to said longitudinal axis, said aerodynamic surface producing a lifting force substantially perpendicular with respect to said top deck acting on said wing.

5. A boat wing apparatus as recited in claim 4, further comprising:
   a control system for operating said boat wing apparatus including,
      tension sensors attached to said struts for measuring said lifting force substantially perpendicular with respect to said top deck acting on said aerodynamic surface, and
      controls for adjusting said pitch of said wing such that said lifting force as measured by said tension sensors can be varied.

6. A boat wing apparatus as recited in claim 5, further comprising:
   means for adjusting said pitch of said wing such that said lifting force acting on said wing as measured by said tension sensors remains substantially constant as said vessel speed varies.

7. A boat wing apparatus as recited in claim 6, further comprising:
   means for controlling said pitch of said vessel such that said pitch of said vessel remains substantially constant as said variable center of gravity of said vessel changes.

8. A sea wing apparatus as recited in claim 7, wherein said control systems includes:
   a computer, said computer having inputs connected to said sensors, said computer having outputs for controlling said pitch of said wing and for adjusting said fore and aft movement of said wing.

9. A sea wing apparatus as recited in claim 8, further comprising:
   balance sensors sensitive to yaw of said vessel, means for varying said wing to correct for said yaw of said vessel.

10. A boat wing apparatus as recited in claim 4, further comprising:
    balance sensors for measuring said pitch of said vessel, and
    controls for adjusting said fore and aft movement of said wing to maintain said pitch of said vessel as measured by said balance sensors.

11. A boat wing apparatus as recited in claim 1, further comprising:
    said propulsion means including a motor and propeller combination, said motor providing torque to said propeller to rotate said propeller in said water, said motor and propeller combination including a means for varying the amount of torque required to rotate said propeller in said water by said motor.

12. A boat wing apparatus as recited in claim 11, wherein:
    said means for varying the amount of torque required to rotate said propeller in said water by said motor includes a two speed transmission.

* * * * *